Dec. 8, 1936.  F. O. CHURCH  2,063,081
MOLDED CUSHION
Filed April 25, 1936
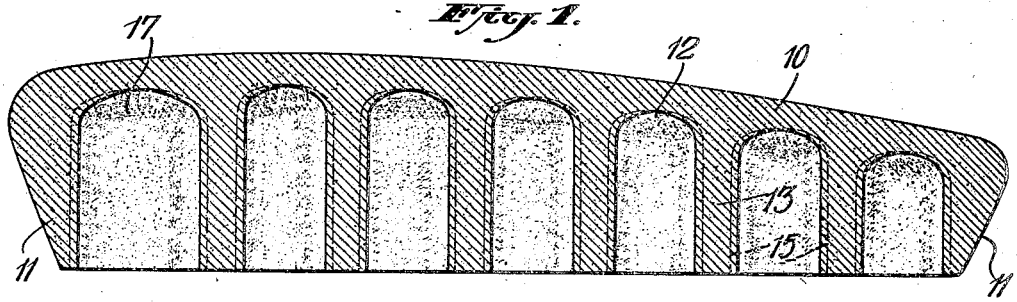
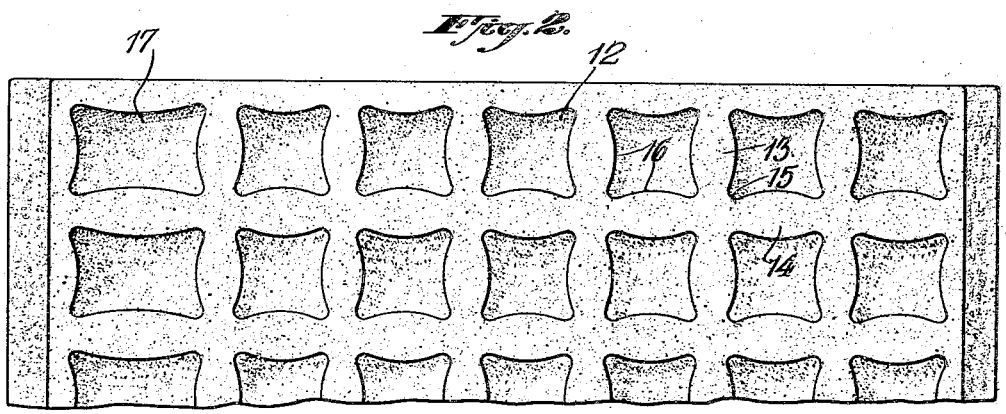
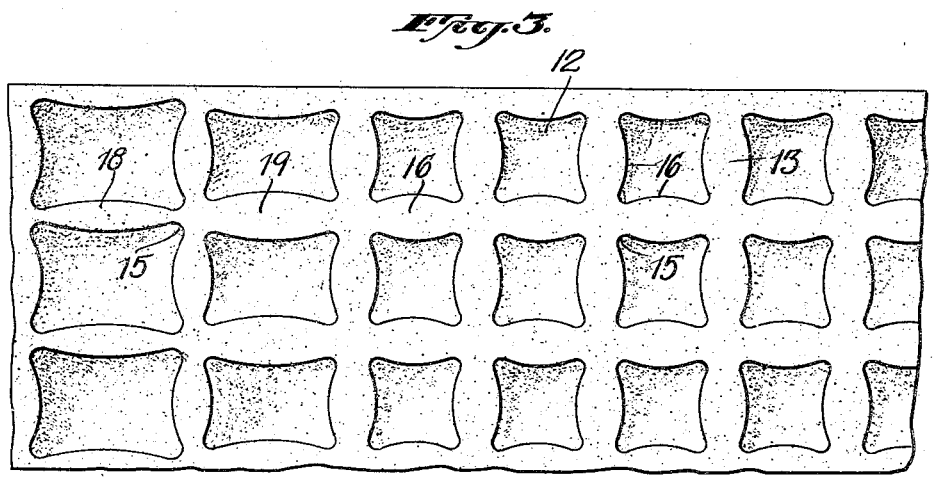
INVENTOR.
FRANKLIN O. CHURCH.
BY
ATTORNEYS Patented Dec. 8, 1936

2,063,081

UNITED STATES PATENT OFFICE 2,063,081

MOLDED CUSHION

Franklin O. Church, Buffalo, N. Y., assignor to Dunlop Tire & Rubber Corporation, Buffalo, N. Y., a corporation of New York Application April 25, 1936, Serial No. 76,310

5 Claims. (Cl. 155—179)

My present invention relates to cushions of molded cellular resilient material, such as sponge rubber or foamed latex rubber.

Heretofore cushions of resilient cellular structure have been formed of a mass of the cellular material with a number of spaced recesses projecting from the underside upwardly into the mass so as to form partition walls between the recesses and a continuous cover slab above the recesses and joining the intersecting walls. In these molded cushions as heretofore constructed, the thickness of the intersecting walls was substantially uniform from one intersection to the next, if a square or polygonal recess was employed or they decreased in thickness if cylindrical recesses were employed. Consequently the cushion was stiffer or harder at the points of intersection inasmuch as the partitions were braced in two directions at these points and were yet relatively more yielding at the intervening portions. The tendency of this was to decrease the uniformity of the cushion or to render it less yielding in certain parts than in others.

In my present invention this variation in the resiliency of the cushion due to stiffening at the intersections of the wall is counteracted by thickening the walls between the intersections. Small fillets are provided between the intersecting surfaces of the partitions, but otherwise the walls are thinnest near the points of intersection and then bow inwardly toward the recesses to progressively increase the thickness of the walls towards their midpoint. This thickening is so proportioned for any given requirement or condition as to compensate for the greater rigidity or stiffness at the points of intersection due to the cross bracing of the intersecting walls. The recesses are preferably domed so as to spread pressure stresses toward the partition walls.

The invention enables the softness of the cushion to be graduated or varied from one area to another by increasing the cross-sectional dimensions of the recesses in those areas where a softer or more yielding cushion is desired. This enlargement of the cross-sectional area may be accompanied either by a wider spacing of the partitions or by decreasing the wall thickness while still maintaining the relative increase in wall thickness between the intersections.

The various features of the invention are illustrated by way of example in the accompanying drawing as applied to a cushion having recesses of rectangular or square cross-section and in which—

Fig. 1 is a vertical section of the cushion; Fig. 2 a bottom view, and Fig. 3 a bottom view of a modified arrangement of the recesses.

The cushion shown in the accompanying drawing is made of a single mass of foamed latex rubber which is poured into a mold having cores projecting upwardly therefrom to form the recesses. The resulting structure has a continuous top slab 10 which is extended downwardly at the edges to form encircling walls 11. Recesses 12 are formed at spaced intervals and project upwardly from the bottom of the cushion through which they open to a height sufficient to form a top slab 10 and to form intersecting partitions 13, that extend in one direction, for example lengthwise, and 14 that extend at a right angle or crosswise.

At the intersection of the walls 13 and 14 small fillets 16 are formed to avoid sharp corners that might weaken the structure. From these points of intersection the surfaces of the intersecting walls 13 and 14 are bowed inwardly toward the centers of the recesses 12 as at 16. As a result, the thickness of the intersecting walls increases toward the point midway of the intersection. Consequently the strength and resistance of the partition walls increases at increased distances from the intersection where the strengthening due to cross bracing of the walls, decreases. Thus the thickening of the walls counterbalances or compensates for the cross bracing at the intersections.

The recesses 12 are domed at their upper ends so as to give an arch-like shape and thus distribute downward stresses acting on the cover slab 10 at the midpoint of the recess outwardly and downwardly to the partition walls.

In certain cushion constructions it is desirable to have less stiffness or to make them more yielding at certain areas than at others. For example, a more comfortable seat cushion is provided if the part near the front edge is somewhat softer than the areas back of this front edge. For this purpose the front recesses as at 17 in Fig. 2 are made wider in one or more dimensions so that there will be less supporting wall area at these sections of decreased stiffness.

The softness or yielding effect of the cushion may be increased by decreasing the wall thickness as at 18 in Fig. 3 as well as increasing the spacings of the walls, both of these being accomplished by suitably increasing the cross-sectional dimensions of the recess.

The change in wall thickness and spacing of the walls may be varied progressively as, for example, by making the walls at 19 in Fig. 3 somewhat thicker and the recesses at this point somewhat smaller than at the point at 18.

What I claim is:—

1. A cushion of cellular resilient material comprising a top slab of said material and intersecting vertical walls beneath said slab, said walls being thicker at the midpoint between successive wall intersections.

2. A cushion of cellular resilient material comprising a top slab of said material and intersecting vertical walls beneath said slab, said walls being thickened progressively toward a point midway between said wall intersections.

3. A cushion of cellular resilient material comprising a top slab of said material, and intersecting vertical walls of said material beneath said slab, said wall surfaces having fillets at their point of intersection and increasing progressively in thickness from said fillets to a midpoint between said walls.

4. A cushion of cellular resilient material comprising a top slab of said material and intersecting vertical walls beneath said slab, said walls forming successive spaced recesses, said recesses being polygonal and having their walls bowed inwardly toward the interior of said recesses to thicken them progressively toward their midpoint.

5. A cushion of cellular resilient material comprising a top slab of said material, and intersecting vertical partition walls of said material joined to said slab and extending therebeneath to form successive spaced recesses, said recesses being domed at their tops and said partition walls being thicker at an intermediate point than at said intersection.

FRANKLIN O. CHURCH.